United States Patent
Samadani

(10) Patent No.: US 7,596,284 B2
(45) Date of Patent: Sep. 29, 2009

(54) HIGH RESOLUTION IMAGE RECONSTRUCTION

(75) Inventor: Ramin Samadani, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1098 days.

(21) Appl. No.: 10/620,937

(22) Filed: Jul. 16, 2003

(65) Prior Publication Data

US 2005/0013509 A1    Jan. 20, 2005

(51) Int. Cl.
    *G06K 9/32* (2006.01)
(52) U.S. Cl. .............. 382/299; 382/298; 348/208.13; 345/698
(58) Field of Classification Search ............. 382/299
    See application file for complete search history.

(56) References Cited

U.S. PATENT DOCUMENTS

| | | | | |
|---|---|---|---|---|
| 4,652,909 A | * | 3/1987 | Glenn | 348/262 |
| 4,667,226 A | * | 5/1987 | Glenn | 348/344 |
| 4,683,496 A | * | 7/1987 | Tom | 348/625 |
| 4,924,521 A | * | 5/1990 | Dinan et al. | 382/254 |
| 5,025,394 A | * | 6/1991 | Parke | 345/475 |
| 5,053,875 A | | 10/1991 | Ishii et al. | |
| 5,067,015 A | * | 11/1991 | Combridge et al. | 375/240.11 |
| 5,148,497 A | * | 9/1992 | Pentland et al. | 382/249 |
| 5,159,453 A | * | 10/1992 | Dhein et al. | 348/598 |
| 5,347,312 A | * | 9/1994 | Saunders et al. | 348/443 |
| 5,351,067 A | * | 9/1994 | Lumelsky et al. | 345/561 |
| 5,510,834 A | * | 4/1996 | Weiss et al. | 348/97 |
| 5,546,130 A | * | 8/1996 | Hackett et al. | 348/447 |
| 5,550,937 A | * | 8/1996 | Bell et al. | 382/293 |
| 5,606,631 A | * | 2/1997 | Weiss et al. | 382/275 |
| 5,623,308 A | * | 4/1997 | Civanlar et al. | 375/240.01 |
| 5,638,107 A | * | 6/1997 | Curry | 347/234 |

(Continued)

FOREIGN PATENT DOCUMENTS

EP    0358498    11/1997

(Continued)

OTHER PUBLICATIONS

David X.D. Yang et al., "A 640×512 CMOS Image Sensor with Ultra Wide Dynamic Range Floating-Point Pixel-Level ADC," ISL, Stanford Univ., Session #17 (1998).

(Continued)

*Primary Examiner*—Matthew C. Bella
*Assistant Examiner*—Sath V. Perungavoor

(57) ABSTRACT

A technique of reconstructing a high resolution image from at least one image sequence of temporally related high and low resolution image frames wherein each of said high resolution image frames includes a low spatial frequency component and a high spatial frequency component is described. The high-resolution image reconstruction technique uses spatial interpolation to generate a low spatial frequency component from a low-resolution image frame of the image sequence. The technique is adapted to generate a high spatial frequency component from at least one high resolution image frame of the image sequence which is closely related to the low resolution image frame, and to remap the high spatial frequency component to a motion-compensated high spatial frequency component estimate of the low resolution image frame. The motion-compensated high spatial frequency component estimate is added to the generated low spatial frequency component to form a reconstructed high-resolution image of the low-resolution image frame.

19 Claims, 4 Drawing Sheets

U.S. PATENT DOCUMENTS

| | | | |
|---|---|---|---|
| 5,649,032 A * | 7/1997 | Burt et al. ................... | 382/284 |
| 5,657,402 A * | 8/1997 | Bender et al. ............... | 382/284 |
| 5,680,487 A * | 10/1997 | Markandey ................ | 382/291 |
| 5,691,768 A * | 11/1997 | Civanlar et al. ........ | 375/240.01 |
| 5,754,246 A * | 5/1998 | Flannaghan ................ | 348/459 |
| 5,784,114 A * | 7/1998 | Borer et al. ................ | 348/452 |
| 5,793,429 A * | 8/1998 | Kim et al. ............ | 375/240.17 |
| 5,799,113 A * | 8/1998 | Lee ........................... | 382/256 |
| 5,805,207 A * | 9/1998 | Watkinson et al. .......... | 348/97 |
| 5,914,725 A * | 6/1999 | MacInnis et al. ........... | 345/441 |
| 5,959,718 A | 9/1999 | Morton | |
| 5,973,733 A | 10/1999 | Gove | |
| 5,978,023 A * | 11/1999 | Glenn ....................... | 348/234 |
| 6,101,235 A * | 8/2000 | Zavaljevski et al. ........... | 378/4 |
| 6,122,004 A * | 9/2000 | Hwang ................ | 348/208.13 |
| 6,198,505 B1 * | 3/2001 | Turner et al. ............ | 348/222.1 |
| 6,208,382 B1 * | 3/2001 | Glenn ....................... | 348/448 |
| 6,266,093 B1 * | 7/2001 | Glenn ....................... | 348/448 |
| 6,269,175 B1 * | 7/2001 | Hanna et al. ................ | 382/107 |
| 6,285,804 B1 * | 9/2001 | Crinon et al. ............... | 382/299 |
| 6,370,196 B1 * | 4/2002 | Griessl et al. .......... | 375/240.16 |
| 6,385,245 B1 | 5/2002 | De Haan et al. | |
| 6,442,203 B1 * | 8/2002 | Demos ................ | 375/240.16 |
| 6,501,794 B1 * | 12/2002 | Wang et al. ............ | 375/240.08 |
| 6,628,805 B1 | 9/2003 | Hansen et al. | |
| 6,778,210 B1 | 8/2004 | Sugahara et al. | |
| 6,879,731 B2 | 4/2005 | Kang et al. | |
| 6,961,083 B2 | 11/2005 | Obrador et al. | |
| 7,009,636 B2 | 3/2006 | Liu et al. | |
| 7,043,058 B2 | 5/2006 | Cornog et al. | |
| 7,061,524 B2 | 6/2006 | Liu et al. | |
| 7,142,600 B1 | 11/2006 | Schonfeld et al. | |
| 7,187,788 B2 | 3/2007 | Simon et al. | |
| 2002/0118761 A1 | 8/2002 | Lee | |
| 2003/0031382 A1 | 2/2003 | Broekaert | |
| 2003/0090593 A1 | 5/2003 | Xiong | |
| 2003/0117611 A1 | 6/2003 | Chon et al. | |
| 2003/0128893 A1 | 7/2003 | Castorina et al. | |
| 2003/0151689 A1 | 8/2003 | Murphy | |
| 2005/0013501 A1 | 1/2005 | Kang et al. | |
| 2005/0013509 A1 * | 1/2005 | Samadani .................... | 382/302 |
| 2005/0046811 A1 * | 3/2005 | Mori et al. ................... | 353/122 |
| 2005/0249286 A1 * | 11/2005 | Nicolas ................ | 375/240.16 |
| 2006/0187308 A1 | 8/2006 | Lim et al. | |
| 2007/0052845 A1 * | 3/2007 | Adams ....................... | 348/452 |
| 2007/0242900 A1 * | 10/2007 | Chen et al. .................. | 382/294 |

FOREIGN PATENT DOCUMENTS

| | | |
|---|---|---|
| EP | 0858208 | 8/1998 |
| EP | 1117251 A1 | 7/2001 |
| WO | WO 99/07156 | 2/1999 |

OTHER PUBLICATIONS

C. Tomasi et al., "Bilateral Filtering for Gray and Color Images," Proc. the 1998 IEEE Int'l Conf. Comp. Vis., Bombay, India (1998).

Xinqiao Liu et al., "Simultaneous Image Formation and Motion Blur Restoration via Multiple Capture," Proc. Int. Conf. Acoustics, Speech, Signal Processing, 2001.

Eero P. Simoncelliy, "Subband Transforms," MIT Media Laboratory Vision and Modeling Technical Report #137, in Subband Coding, CH4, John Wood ed., Kluwer Academic Press (1990).

A. Murat Tekalp, "Digital Video Processing," Prentice Hall, chapters 4 and 16 (1995).

Zhigang Zhu et al., "Camera Stabilization Based on 2.5D Motion Camera Stabilization Based on 2.5D Motion," IEEE Int'l Conf on Intelligent Vehicles, Stuttgart Germany (1998).

Bernd Heisele, "Motion-Based Object Detection and Tracking in Color Image Sequences," Proceedings IEEE 4th Int'n Conf. on Image Processing (ICIP-97), vol. III (Oct. 1997).

* cited by examiner

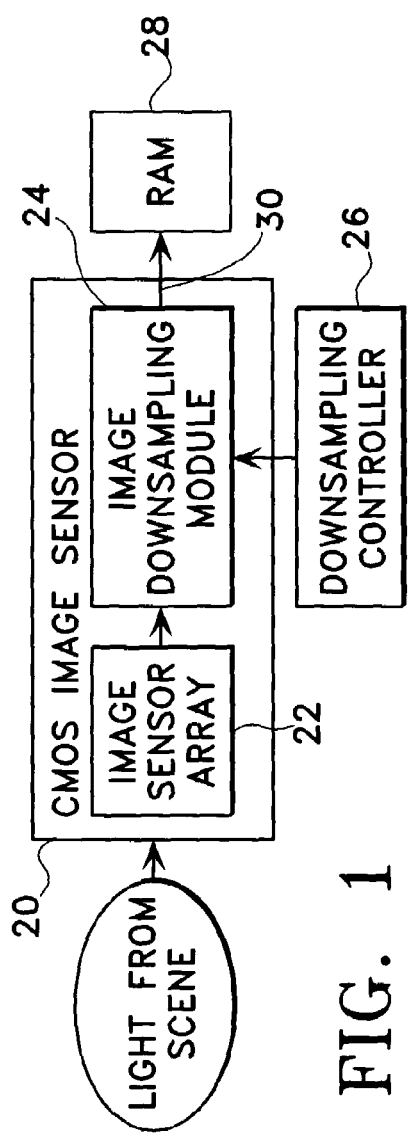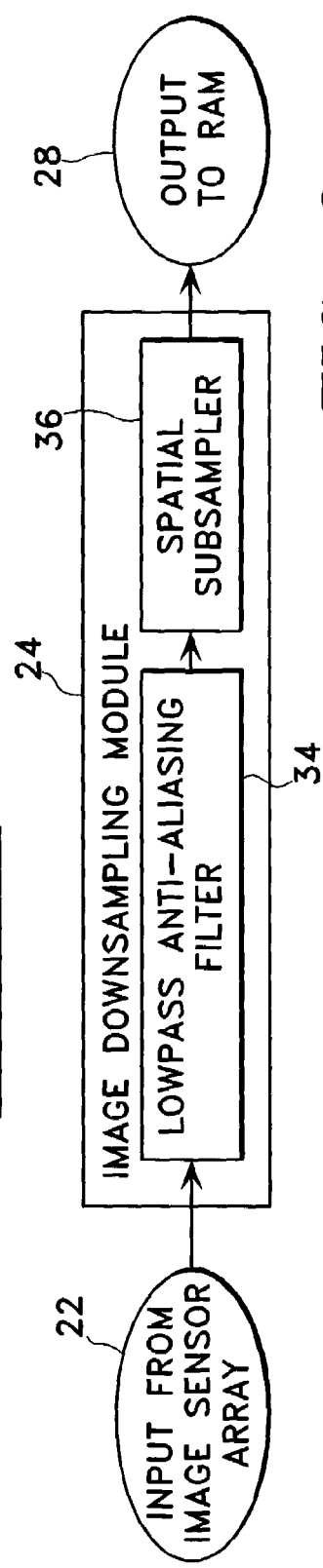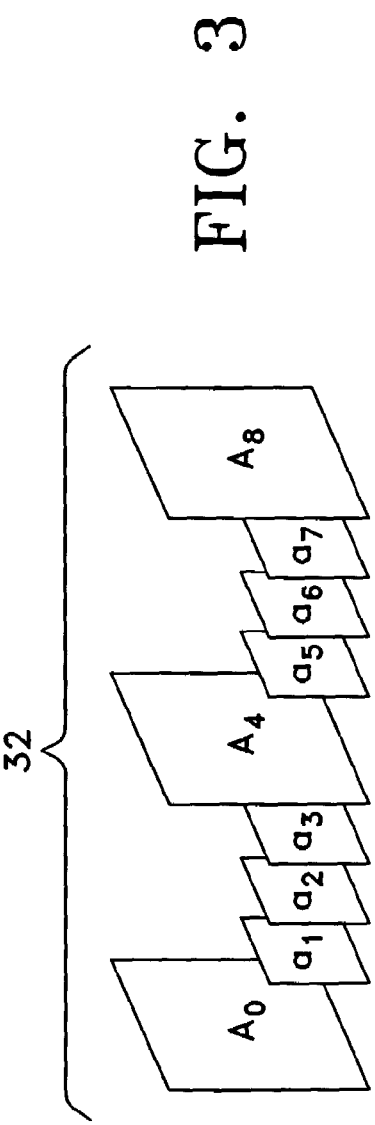

HIGH RESOLUTION IMAGE RECONSTRUCTION

FIELD OF THE INVENTION

The present invention relates generally to digital image processing and more particularly to interpolation of a mixed resolution image sequence for high-resolution image reconstruction.

BACKGROUND OF THE INVENTION

Digital video processing refers to manipulation of the digital video bitstream. Some applications of digital video processing include standards conversion, image enhancement, high resolution image reconstruction, etc.

One known method for high-resolution image reconstruction includes the use of spatial interpolation to produce a low spatial frequency image estimate from a captured low-resolution image frame. The estimate, however, may appear blurry as it does not incorporate any related high spatial frequency information from neighboring high-resolution image frames and, consequently, does not allow large size prints of the captured low-resolution image.

Another known high-resolution image reconstruction method uses non-linear image interpolation which improves somewhat the spatial resolution of the resulting estimate, but the improvement is based on statistical information about high spatial frequency content. Furthermore, this method requires training with a set of parameters (images).

None of the known image reconstruction methods utilize high spatial frequency data from closely related high-resolution image frames.

SUMMARY OF THE INVENTION

The present disclosure is generally directed to a high resolution image reconstruction method, comprising generating at least one image sequence of temporally related high and low resolution image frames, each of the high resolution image frames including a low spatial frequency component and a high spatial frequency component; using spatial interpolation to generate a low spatial frequency component from a low resolution image frame of the image sequence; generating a high spatial frequency component from at least one high resolution image frame of the image sequence, the high resolution image frame being closely related to the low resolution image frame; remapping the high spatial frequency component to a motion-compensated high spatial frequency component estimate of the low resolution image frame; and adding the motion-compensated high spatial frequency component estimate of the low resolution image frame to the generated low spatial frequency component of the low resolution image frame to form a reconstructed high resolution image of the low resolution image frame.

These and other aspects of the present invention will become apparent from a review of the accompanying drawings and the following detailed description of the preferred embodiments of the present invention.

BRIEF DESCRIPTION OF THE DRAWINGS

The invention is generally shown by way of example in the accompanying drawings in which:

FIG. 1 is a schematic representation of an embodiment of an image sensor having integrated light sensing and subsequent signal processing capability for use in accordance with the present invention;

FIG. 2 is a schematic representation of an embodiment of an image downsampling module for use in accordance with the present invention;

FIG. 3 is a schematic representation of an embodiment of a mixed spatial resolution image sequence in accordance with the present invention;

DETAILED DESCRIPTION OF THE PREFERRED EMBODIMENTS

Figure 4:
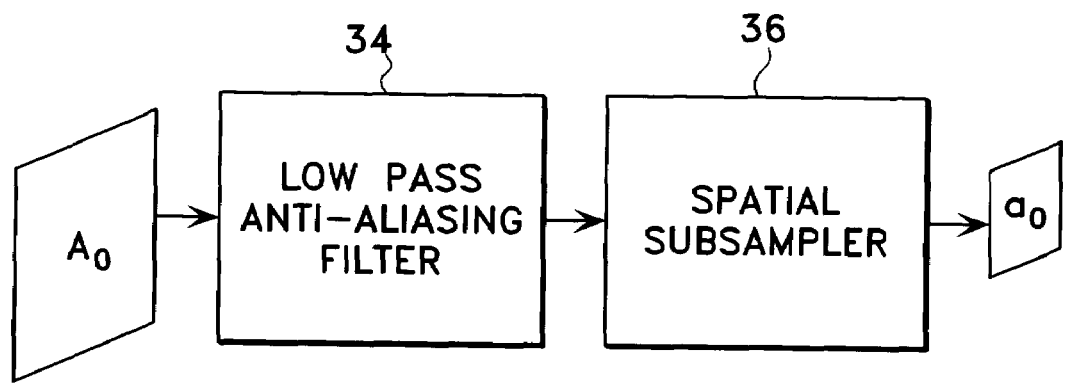
FIG. 4 is a schematic representation of an embodiment of an image downsampling (decimation) in accordance with the present invention.

Hereinafter, some preferred embodiments of the present invention will be described in detail with reference to the related drawings of FIGS. 1-12. Additional embodiments, features and/or advantages of the invention will become apparent from the ensuing description or may be learned by practicing the invention.

The drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Current CMOS (complementary metal-oxide semiconductor) image sensor technology allows the integration of light sensing elements and subsequent digital image signal processing. One known example of such CMOS technology allows a digital camera to switch seamlessly between high resolution and low resolution video without sacrificing the image quality of either. Specifically, signals from adjacent pixels can be combined into groups and read as one larger pixel with the size and configuration of a pixel group being variable and controlled by specialized integrated circuitry. Smaller pixels offer the benefit of higher resolution and sharper images. Larger pixels offer the benefit of higher light sensitivity required for low light still scenes and video applications. In other words, a CMOS image sensor of this type can be addressed in variable resolutions and thus, is capable of capturing a high-resolution video frame in the midst of recording motion video since pixel sizing can be done instantaneously.

Turning to FIG. 1, a variable resolution CMOS image sensor, generally referred to by a reference numeral 20, preferably comprises an image sensor array 22 operatively coupled to an image downsampling module 24. Image sensor array 22 is adapted to sense light from a scene, as generally shown in FIG. 1. Image downsampling module 24 is operatively coupled between a downsampling controller 26 and RAM (random access memory) 28 (FIG. 1), i.e., the size of output images may be controlled for each frame. For example, RAM input signal 30 (FIG. 1) may be a sequence of image frames, taken 1/30 seconds apart, having different spatial resolutions such as low (640×480 pixels) spatial resolution image frames and high (1920×1440 pixels) spatial resolution image frames. A mixed spatial resolution image sequence of this type is shown schematically in FIG. 3 and generally referred to by a reference numeral 32. For example, image sequence 32 (FIG. 3) may comprise high spatial resolution image frame $A_0$ followed by a series of low spatial resolution image frames $a_1$-$a_3$ which is followed by high spatial resolution image frame $A_4$ which, in turn, is followed by a series of low spatial resolution image frames $a_5$-$a_7$, which is followed by high spatial resolution image frame $A_8$, etc.

FIG. 2 schematically illustrates an embodiment of the internal components of image downsampling module 24, namely, a low pass anti-aliasing filter 34 and a spatial subsampler 36. Low pass anti-aliasing filter 34 is operatively coupled between image sensor array 22 and spatial subsampler 36. Spatial subsampler 36 outputs to RAM 28, as generally depicted in FIG. 2. Image downsampling is performed by filtering and subsampling the input image data. Those skilled in the art will note that the two steps may be combined for efficient implementation. According to this embodiment, the image data is convolved with a low pass anti-aliasing filtering 34. Subsampling is controlled via downsampling controller 26. For example, downsampling controller 26 may instruct spatial subsampler 36 to discard 2 of 3 samples, in each dimension, to downsample a 1920×1440 pixel frame to a 640×480 pixel frame.

Due to practical limitations in memory and bandwidth, not all captured image frames may be of high spatial resolution, i.e., only some high spatial resolution image frames such as, for example, $A_0$, $A_4$, $A_8$, are retained with the rest being automatically downsampled (by CMOS image sensor 20) such as, for example, $a_1$-$a_3$, $a_5$-$a_7$, as generally shown in FIG. 3. High spatial resolution images such as $A_0$, $A_4$, $A_8$ will produce good quality large size prints, i.e. may be printed directly without further processing. However, low spatial resolution images such as $a_1$-$a_3$, $a_5$-$a_7$ will not produce good quality large size prints because of low spatial resolution. On the other hand, the upper limit in size of a good quality print is determined, to a great extent, by the spatial resolution of the input image sequence. Therefore, being capable of reconstructing a good quality high spatial resolution image from an available low-resolution image is a desirable feature for digital cameras and/or image processing software.

Figure 8:
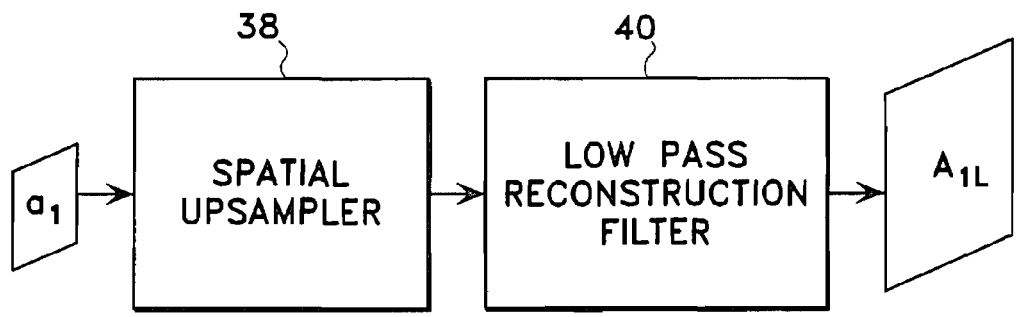
FIG. 8 is a schematic representation of an embodiment of a second spatial interpolation in accordance with the present invention.

In order to produce a good quality large size print from a low spatial resolution image frame such as, for example, $a_1$, a fairly good high spatial resolution image estimate $\hat{A}_1$ must be formed of the original (unavailable) image frame $A_1$. In general, $\hat{A}_1$ is a combination of high and low spatial frequency components, $\hat{A}_{1H}$, $A_{1L}$, respectively, i.e. $\hat{A}_1 = A_{1L} + \hat{A}_{1H}$. The low spatial frequency component $A_{1L}$ of original (unavailable) $A_1$ may be generated via spatial interpolation, as generally illustrated in FIG. 8. Specifically, available low resolution image $a_1$ (FIG. 3) may be passed through a spatial upsampler 38 (FIG. 8) and a low pass reconstruction filter 40 (FIG. 8) to produce low spatial frequency component $A_{1L}$ which is essentially a "blurry" version of unavailable high resolution image $A_1$. Spatial upsampler 38 may be programmed to utilize standard bicubic or bilinear algorithms. Alternatively, spatial upsampler 38 may be programmed to utilize least squares error minimization algorithms to produce a relatively sharper upsampled image in accordance with a preferred embodiment of the present invention. In particular, given a downsampling matrix B, applying its pseudo-inverse $B^+$ to the image calculates an upsampled approximation that is closest, in the least squares sense, to the original image.

Figure 5:
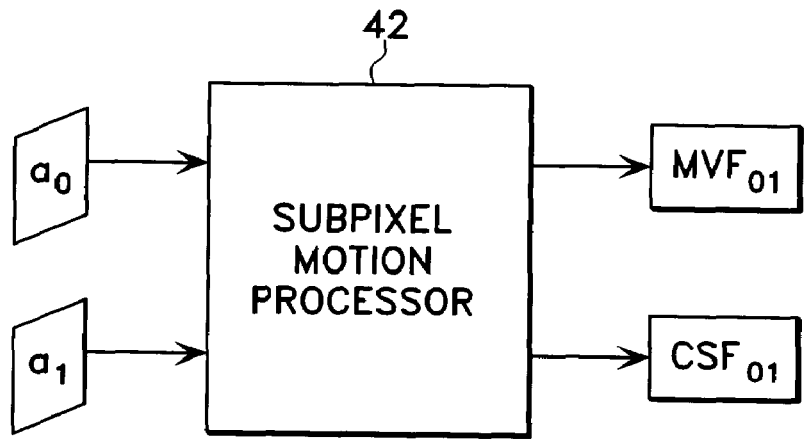
FIG. 5 is a schematic representation of an embodiment of a subpixel motion processing in accordance with the present invention.
Figure 6:
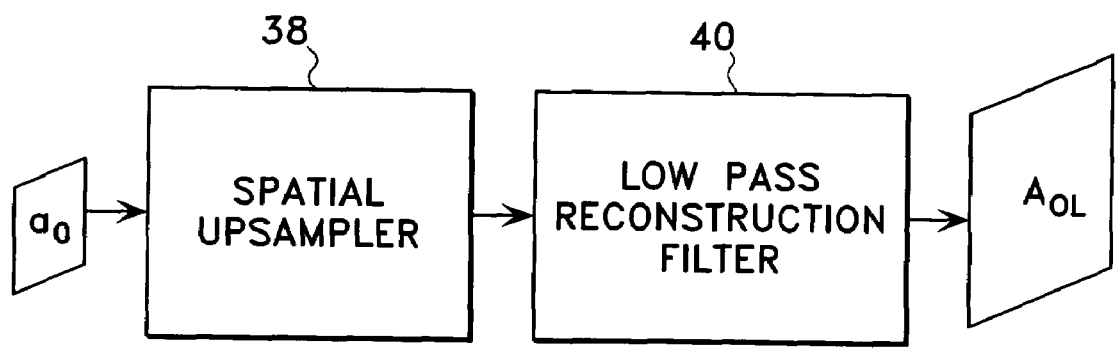
FIG. 6 is a schematic representation of an embodiment of a first spatial interpolation in accordance with the present invention.
Figure 7:
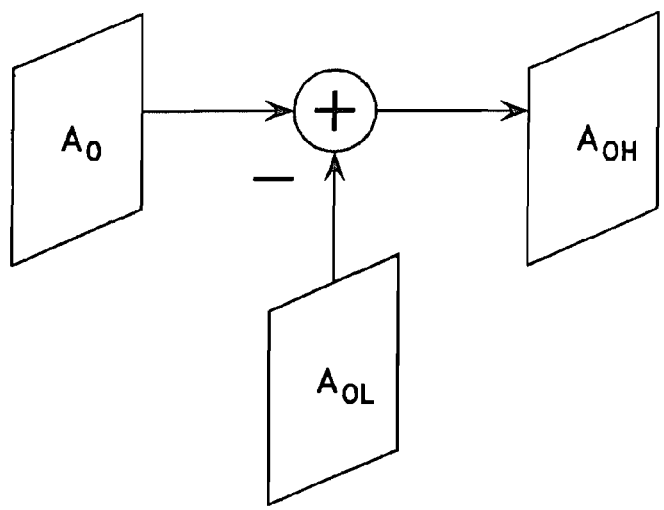
FIG. 7 is a schematic representation of an embodiment of high spatial frequency image component determination in accordance with the present invention.

FIG. 4 schematically illustrates an embodiment of image downsampling (decimation) in accordance with a preferred embodiment of the present invention. Specifically, available and closely related high spatial resolution image $A_0$ may be passed through low pass anti-aliasing filter 34 and spatial subsampler 36 (of image downsampling module 24 to produce a low spatial resolution image $a_0$, i.e. a downsampled version of itself. As generally depicted in FIG. 5, the generated low spatial resolution image $a_0$ (FIG. 4) and the available low spatial resolution image $a_1$ (FIG. 3) may be fed into a subpixel motion processor 42 to generate subpixel accuracy motion vector field $MVF_{01}$ and associated motion confidence scalar field $CSF_{01}$, respectively, i.e. each motion vector would have an associated confidence scalar value. Furthermore, the generated low spatial resolution image $a_0$ (FIG. 4) may be fed into spatial upsampler 38 and low pass reconstruction filter 40, as generally illustrated in FIG. 6, to produce low spatial frequency component $A_{0L}$ which is essentially a "blurry" version of originally available high spatial resolution image $A_0$ (FIG. 3). The generated low spatial frequency component $A_{0L}$ may then be subtracted from originally available high spatial resolution image $A_0$ (FIG. 3) to obtain a residual high spatial frequency component $A_{0H}$, as generally shown in FIG. 7.

Figure 9:
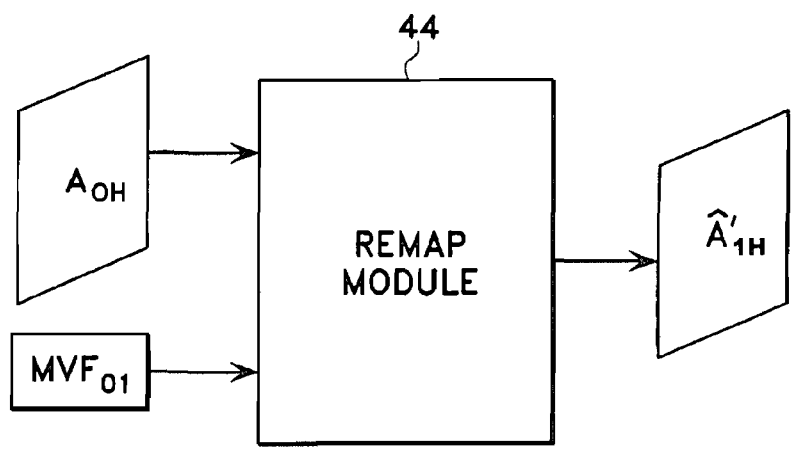
FIG. 9 is a schematic representation of an embodiment of motion-compensated image remapping in accordance with the present invention.
Figure 10:
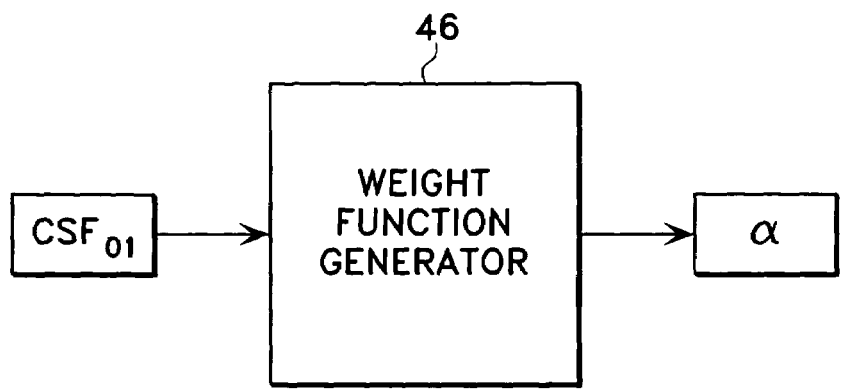
FIG. 10 is a schematic representation of an embodiment of motion confidence scalar field processing to form per-pixel weights $\alpha$ in accordance with the present invention.
Figure 11:
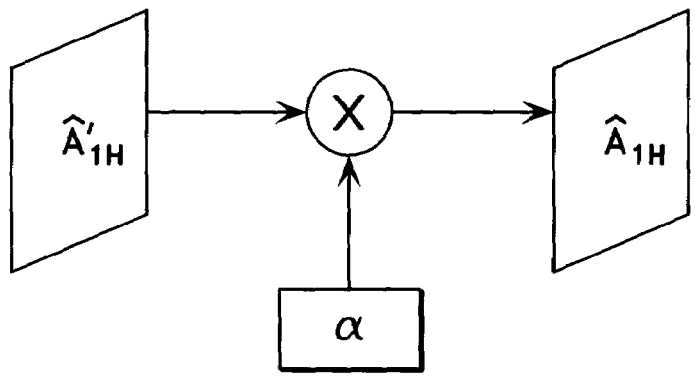
FIG. 11 is a schematic representation of an embodiment of high spatial frequency image component estimation using the per-pixel weights $\alpha$ of FIG. 10 in accordance with the present invention.
Figure 12:
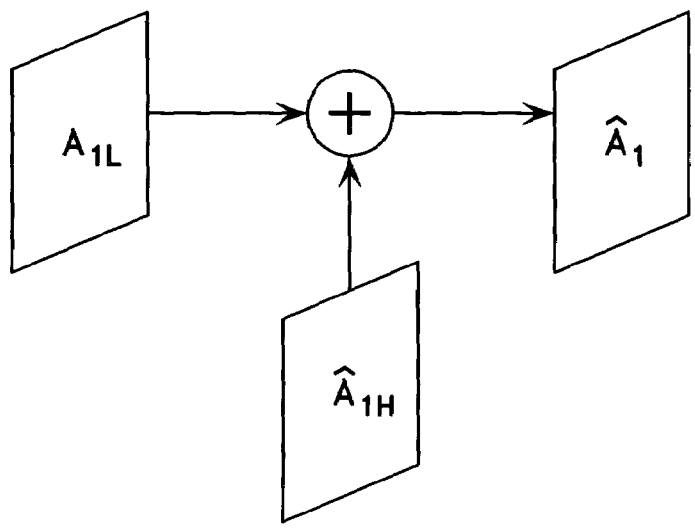
FIG. 12 is a schematic representation of an embodiment of high-resolution image reconstruction in accordance with the present invention.

In accordance with another embodiment of the present invention, the obtained residual high spatial frequency component $A_{0H}$ and subpixel accuracy motion vector field $MVF_{01}$ may be fed into a remap module 44 to produce an unweighted motion-compensated (remapped) residual high spatial frequency component $\hat{A}'_{1H}$, as generally depicted in FIG. 9. Moreover, the generated motion confidence scalar field $CSF_{01}$ may be processed via a standard weight function generator 46 to form corresponding per-pixel weights α, as generally shown in FIG. 10. Weight function generator 46 preferably includes a pixel weight look-up table (not shown). The weights a basically control how much of the remapped residual high spatial frequency component $\hat{A}'_{1H}$ is added to the low spatial frequency component $A_{1L}$ to form the final reconstructed high spatial resolution image estimate $\hat{A}_1$. Specifically, the weights α are multiplied by the unweighted remapped residual high spatial frequency component $\hat{A}'_{1H}$ to generate corresponding weighted remapped residual high spatial frequency component $\hat{A}_{1H}$, as generally shown in FIG. 11. The weighted residual high spatial frequency component $\hat{A}_{1H}$ and low spatial frequency component $A_{1L}$ may then be added to obtain a fairly good high spatial resolution image estimate $\hat{A}_1$ of original, unavailable high spatial resolution image $A_1$. In this regard, one possible method for computing motion confidence is to apply cross-correlation matching to determine when the motion is well described by a simple translation. For motion vectors with full confidence (α=1) the full high spatial frequency residuals may be added. For motion vectors with low confidence, less of the high spatial frequency residuals may be added to control for possible ghosting artifacts. The degree of motion estimation accuracy essentially controls the sharpness of the reconstructed high-resolution image.

A person skilled in the art would readily recognize that the above-described novel high resolution image reconstruction method may be easily generalized to take advantage of additional high-resolution frames that might be available in the mixed pipeline output. A person skilled in the art should also recognize that given a low resolution image, the described image reconstruction method may be expanded to obtain a good high resolution image estimate not just from one neighboring (temporally related) high resolution image, but also from two or more closely related high resolution images. The novel high-resolution image reconstruction method may be used in a variety of applications such as to restore a video sequence to a higher resolution, allowing for high quality digital zoom, and/or to improve printing from video frames.

Furthermore, the above-described components of FIGS. 5-12, inclusive, may be integrated in hardware or software form depending on desired application.

Other components and/or configurations may be utilized in the above-described embodiments, provided such other components and/or configurations do not depart from the intended purpose and scope of the present invention. While the present invention has been described in detail with regards to one or more preferred embodiments, it should also be appreciated that various modifications and variations may be made in the present invention without departing from the scope or spirit of the invention. In this regard it is important to note that practicing the invention is not limited to the applications described hereinabove. Other applications and/or alterations may become apparent to those skilled in the art.

It should be appreciated by a person skilled in the art that features illustrated or described as part of one embodiment may also be used in other embodiments. It is, therefore, intended that the present invention cover all such modifications, embodiments and variations as long as such modifications, embodiments and variations remain within the scope of the appended claims and their equivalents.

What is claimed is:

1. A system for reconstructing a high resolution image from at least one image sequence of temporally related high and low resolution image frames, each of said high resolution image frames including a low spatial frequency component and a high spatial frequency component, said system comprising:

a tangible memory storing instructions; and a processor coupled to the memory, operable to execute the instructions, and based at least in part on the execution of the instructions operable to perform operations comprising generating a low spatial frequency component from a low resolution image frame of said at least one image sequence;

generating a high spatial frequency component from at least one high resolution image frame of said at least one image sequence, said at least one high resolution image frame being closely related to said low resolution image frame;

mapping said high spatial frequency component to a motion-compensated high spatial frequency component estimate of said low resolution image frame;

adding said motion-compensated high spatial frequency component estimate of said low resolution image frame to said generated low spatial frequency component of said low resolution image frame to form a reconstructed high resolution image of said low resolution image frame; and controlling relative contributions of said motion-compensated high spatial frequency component estimate of said low resolution image frame and said generated low spatial frequency component of said low resolution image frame in the reconstructed high resolution image of said low resolution image frame based on measures of confidence in motion estimates used to map said high spatial frequency component to the motion-compensated high spatial frequency component estimate of said low resolution image frame.

2. The high resolution image reconstruction system of claim 1, wherein in the generating of the low spatial frequency component the processor performs operations comprising upsampling the low resolution image frame in accordance with a bicubic upsampling algorithm.

3. The high resolution image reconstruction system of claim 1, wherein in the generating of the low spatial frequency component the processor performs operations comprising upsampling the low resolution image frame in accordance with a bilinear upsampling algorithm.

4. The high resolution image reconstruction system of claim 1, wherein in the generating of the low spatial frequency component the processor performs operations comprising upsampling the low resolution image frame in accordance with a least squares error minimization algorithm.

5. The high resolution image reconstruction system of claim 1, wherein in the generating of the high spatial frequency component the processor performs operations comprising downsampling at least one high resolution image frame of said at least one image sequence.

6. A system for reconstructing a high resolution image from at least one image sequence of temporally related high and low resolution image frames, each of said high resolution image frames including a low spatial frequency component and a high spatial frequency component, said system comprising:

a tangible memory storing instructions; and a processor coupled to the memory, operable to execute the instructions, and based at least in part on the execution of the instructions operable to perform operations comprising generating a low spatial frequency component from a low resolution image frame of said at least one image sequence;

generating a high spatial frequency component from at least one high resolution image frame of said at least one image sequence, said at least one high resolution image frame being closely related to said low resolution image frame, wherein in the generating of the high spatial frequency component the processor performs operations comprising downsampling at least one high resolution image frame of said at least one image sequence and a subpixel motion processor for generating a motion vector field and a confidence scalar field from said downsampled high resolution image frame and said low resolution image frame of said at least one image sequence;

mapping said high spatial frequency component to a motion-compensated high spatial frequency component estimate of said low resolution image frame; and adding said motion-compensated high spatial frequency component estimate of said low resolution image frame to said generated low spatial frequency component of said low resolution image frame to form a reconstructed high resolution image of said low resolution image frame.

7. The high resolution image reconstruction system of claim 6, wherein in the generating of the high spatial frequency component the processor performs operations comprising generating a low spatial frequency component from said downsampled high resolution image frame.

8. The high resolution image reconstruction system of claim 7, wherein in the generating of the high spatial frequency component the processor performs operations comprising subtracting said generated low spatial frequency component from said at least one high resolution image frame of said at least one image sequence to obtain a high spatial frequency component of said at least one high resolution image frame of said at least one image sequence.

9. A method of reconstructing a high-resolution image from at least one image sequence of temporally related high and low resolution image frames, each of said high-resolution image frames including a low spatial frequency component and a high spatial frequency component, the method comprising operating a processor to perform operations comprising:
spatially interpolating to generate a low spatial frequency component from a low-resolution image frame of said at least one image sequence;
generating a high spatial frequency component from at least one high resolution image frame of said at least one image sequence, said at least one high resolution image frame being closely related to said low resolution image frame;
remapping said high spatial frequency component to a motion-compensated high spatial frequency component estimate of said low resolution image frame;
adding said motion-compensated high spatial frequency component estimate of said low resolution image frame to said generated low spatial frequency component of said low resolution image frame to form a reconstructed high resolution image of said low resolution image frame; and
controlling relative contributions of said motion-compensated high spatial frequency component estimate of said low resolution image frame and said generated low spatial frequency component of said low resolution image frame in the reconstructed high resolution image of said low resolution image frame based on measures of confidence in motion estimates used to map said high spatial frequency component to the motion-compensated high spatial frequency component estimate of said low resolution image frame.

10. The method of claim 9, wherein said spatially interpolating is performed by bicubic upsampling.

11. The method of claim 9, wherein said spatially interpolating is performed by bilinear upsampling algorithm.

12. The method of claim 9, wherein said spatially interpolating is performed by utilizes a least squares error minimization algorithm.

13. The method of claim 9, wherein said high spatial frequency component generating further comprises downsampling at least one high resolution image frame of said at least one image sequence.

14. A method of reconstructing a high-resolution image from at least one image sequence of temporally related high and low resolution image frames, each of said high-resolution image frames including a low spatial frequency component and a high spatial frequency component, the method comprising operating a processor to perform operations comprising:
spatially interpolating to generate a low spatial frequency component from a low-resolution image frame of said at least one image sequence;
generating a high spatial frequency component from at least one high resolution image frame of said at least one image sequence, said at least one high resolution image frame being closely related to said low resolution image frame, wherein said high spatial frequency component generating further comprises downsampling at least one high resolution image frame of said at least one image sequence and subpixel motion processing for the purpose of generating a motion vector field and a confidence scalar field from said downsampled high resolution image frame and said low resolution image frame of said at least one image sequence;
remapping said high spatial frequency component to a motion-compensated high spatial frequency component estimate of said low resolution image frame; and
adding said motion-compensated high spatial frequency component estimate of said low resolution image frame to said generated low spatial frequency component of said low resolution image frame to form a reconstructed high resolution image of said low resolution image frame.

15. The method of claim 14, wherein the generating of said high spatial frequency component further comprises spatially interpolating to generate a low spatial frequency component from said downsampled high-resolution image frame.

16. The method of claim 15, wherein the generating of said high spatial frequency component further comprises subtracting said generated low spatial frequency component from said at least one high resolution image frame of said at least one image sequence to obtain a high spatial frequency component of said at least one high resolution image frame of said at least one image sequence.

17. A system for reconstructing a high resolution image from a mixed spatial resolution image sequence comprising temporally spaced-apart image frames having different respective spatial resolutions, the system comprising:
a tangible memory storing instructions; and
a processor coupled to the memory, operable to execute the instructions, and based at least in part on the execution of the instructions operable to perform operations comprising
generating a first spatial frequency component from a first image frame selected from the image sequence, the first image frame having a first spatial resolution;
generating a second spatial frequency component from a second image frame selected from the image sequence, the second image frame having a second spatial resolution higher than the first spatial resolution;
spatially aligning the first and second spatial frequency components based on estimates of motion between the first and second image frames; and
producing a high resolution image of the first image frame from a combination of the spatially aligned first and second spatial frequency components, wherein the combiner produces the high resolution image of the first image frame from the spatially aligned first and second spatial frequency components with relative contributions controlled by measures of confidence in motion estimates used to spatially align the first and second spatial frequency components.

18. The system of claim 17, wherein in the producing the processor performs operations comprising the high resolution image of the first image frame with relative contributions from the second frequency component that increase with increasing measures of confidence in the associated motion estimates.

19. A method of reconstructing a high resolution image from a mixed spatial resolution image sequence comprising temporally spaced-apart image frames having different respective spatial resolutions, the method comprising operating a processor to perform operations comprising:
generating a first spatial frequency component from a first image frame selected from the image sequence, the first image frame having a first spatial resolution;
generating a second spatial frequency component from a second image frame selected from the image sequence, the second image frame having a second spatial resolution higher than the first spatial resolution;
spatially aligning the first and second spatial frequency components based on estimates of motion between the first and second image frames; and
producing a high resolution image of the first image frame from a combination of the spatially aligned first and second spatial frequency components, wherein the producing comprises combining the spatially aligned first and second spatial frequency components based on measures of confidence in the estimates of motion.

\* \* \* \* \*